(No Model.)
L. E. DUNLAP.
INK PREPARATION.
No. 590,139. Patented Sept. 14, 1897.
WITNESSES.
Matthew M. Blunt,
Samuel P. Thrasher
INVENTOR.
Louis E. Dunlap
by
ATT'Y.

UNITED STATES PATENT OFFICE.

LOUIS E. DUNLAP, OF ARLINGTON, MASSACHUSETTS, ASSIGNOR OF ONE-HALF TO ALBERT H. SPENCER, OF BOSTON, MASSACHUSETTS.

INK PREPARATION.

SPECIFICATION forming part of Letters Patent No. 590,139, dated September 14, 1897.

Application filed November 24, 1894. Serial No. 529,787. (No specimens.)

*To all whom it may concern:*

Be it known that I, LOUIS E. DUNLAP, of Arlington, in the county of Middlesex and State of Massachusetts, have invented a new and useful Improvement in Ink Preparations, of which the following, taken in connection with the accompanying drawing, is a specification.

The object of my invention is to provide an ink preparation in solid, paste, or powder form, from which fluid ink may be instantly produced, when desired, by the addition of sufficient water to properly dissolve it.

The peculiarity of my preparation is the incorporation with or in the ink-producing compound or material of one or more ingredients adapted to produce effervescence when the matter is dissolved, so as to cause a thorough and complete admixture of all the elements without the necessity of stirring or shaking. The ink is thus ready for immediate use and is of a uniform quality and color without sediment, differing thus from the product of ordinary ink-powders, which dissolve slowly, imperfectly, and after mechanical manipulation.

By my improvement the coloring-matter is immediately diffused throughout the liquid by reason of the effervescence.

My improved ink is preferably put up in the form of small tablets or thickened disks and consists of anilin of the desired color or other ink-producing material with bicarbonate of soda or the like and with a suitable acid to produce an effervescent action when the tablet is dissolved, such effervescence serving to immediately diffuse the ink substance throughout the solution, so that fluid ink ready for use results.

When the preparation is to be put up as a tablet, enough gum-arabic or saccharine matter is added to serve as a binder when the disks are compressed.

The drawing represents in perspective a series of ink-tablets made according to my invention.

A suitable formula for about twelve tablets may be stated as follows: Nigrosene or anilin, sixty grains; sodium bicarbonate, seventeen grains; tartaric acid, sixteen grains; gum-arabic, twelve grains. Subdivide and compress.

I am aware that it is old to inclose an acid and an alkali, mechanically separated, in the same package with sugar, either plain or medicated, for the purpose of generating carbonic-acid gas as an element of the beverage or medicine to be swallowed, thus providing for a portable soda water. I do not claim any such preparation or practice.

I claim as my invention—

1. An ink-producing compound in a dry form, in combination with an acid and an alkali intermixed therewith, also in a dry form, and adapted to produce effervescent action and liquid ink when the preparation is dissolved, substantially as set forth.

2. An ink-producing compound in a non-liquid form, in combination with an acid and an alkali intermixed therewith and adapted to produce effervescent action and liquid ink when the preparation is dissolved, substantially as set forth.

3. A portable dry-ink compound in the form of compressed disks or tablets, the same consisting of ink material proper in combination with an acid and an alkali intermixed therewith and adapted to produce effervescent action and liquid ink when the preparation is dissolved, substantially as set forth.

4. A portable dry-ink compound in the form of compressed disks or tablets consisting of ink material proper, a suitable gum or saccharine binder, and an acid and an alkali intermixed therewith and adapted to produce effervescent action and liquid ink when the preparation is dissolved, substantially as set forth.

In testimony whereof I have signed my name to this specification in the presence of two subscribing witnesses.

LOUIS E. DUNLAP.

Witnesses:
CHARLES D. KEYES,
A. H. SPENCER.